United States Patent
Huber-Buschbeck et al.

(10) Patent No.: US 7,752,147 B2
(45) Date of Patent: Jul. 6, 2010

(54) SYSTEMS AND METHODS FOR DYNAMIC DETERMINATION OF ROUNDING RULES

(75) Inventors: Andreas Huber-Buschbeck, Heiligkreuzsteinach (DE); Hans-Ulrich Von Helmolt, Heidelberg (DE); Michael Schweitzer, Leimen (DE)

(73) Assignee: SAP AG, Walldorf (DE)

( * ) Notice: Subject to any disclaimer, the term of this patent is extended or adjusted under 35 U.S.C. 154(b) by 755 days.

(21) Appl. No.: 11/516,699

(22) Filed: Sep. 7, 2006

(65) Prior Publication Data

US 2007/0078799 A1 Apr. 5, 2007

(30) Foreign Application Priority Data

Sep. 7, 2005 (EP) .................................. 05108219

(51) Int. Cl.
*G06F 15/18* (2006.01)
(52) U.S. Cl. ....................................................... 706/12
(58) Field of Classification Search ................. 177/145; 141/83; 705/1, 26; 700/28, 32, 49, 52, 95, 700/97, 99, 103, 104, 106, 112, 216, 220, 700/222, 223, 231, 236, 244, 305; 702/82, 702/83, 128, 129; 377/6, 10, 13; 414/675, 414/901; 706/12
See application file for complete search history.

(56) References Cited

U.S. PATENT DOCUMENTS

| | | | | |
|---|---|---|---|---|
| 4,749,008 | A | * 6/1988 | Whitney et al. | 141/1 |
| 6,199,603 | B1 | * 3/2001 | DiGianfilippo et al. | 141/83 |
| 2002/0042756 | A1 | * 4/2002 | Kumar et al. | 705/26 |
| 2003/0102169 | A1 | * 6/2003 | Balboni et al. | 177/145 |

\* cited by examiner

*Primary Examiner*—Donald Sparks
*Assistant Examiner*—Peter Coughlan
(74) *Attorney, Agent, or Firm*—Finnegan, Henderson, Farabow, Garrett & Dunner, LLP

(57) ABSTRACT

Systems, methods, and computer-readable media are provided for packing products according to a packaging specification, whereby a packaging specification is defined by a plurality of packaging parameters. In one implementation, a method is provided that includes a first step of selecting, based on a plurality of access sequences, at least one packaging specification out of a plurality of packaging specifications, and a second step of determining a resulting packaging specification out of the selected packaging specifications.

19 Claims, 5 Drawing Sheets

SYSTEMS AND METHODS FOR DYNAMIC DETERMINATION OF ROUNDING RULES

TECHNICAL FIELD

The present invention relates generally to the field of data processing and to systems and methods for managing inventory within one or more electronic or e-business systems that may comprise procurement systems, sales information systems, purchasing systems, logistic information systems, or supply chain management systems. More particularly, and without limitation, the present invention relates to systems and methods for optimizing a packaging process within a supply chain management system using dynamic determination of rounding rules.

BACKGROUND INFORMATION

The success of a business company may depend essentially on the requirement that customer demands on goods and services be fulfilled precisely, cost-efficiently, and on time. Therefore, many companies make use of supply chain management systems to control and optimize their production and delivery processes.

Supply chain management may include the process of coordinating the flow of goods, services, information, and finances between the involved parties, such as manufactures, suppliers, wholesalers, retailers, and consumers. This process may include, for example, order processing, information feedback, and timely delivering the ordered goods and services.

In current supply chain management systems, packaging specifications define the number of products that need to be packed together for a package size in order to guaranty that the quantity of products to be transported and delivered is only a multiple of given packages. These packaging specifications are product dependent and lack flexibility with respect to the rounding of a required number of products.

In view of the foregoing, there is a need for systems and methods for optimizing a packaging process within a supply chain management system.

SUMMARY

Embodiments consistent with the present invention provide systems, methods, and computer program products for dynamic determination of rounding rules and optimization of a packaging process.

In one embodiment, a method is provided for packing products according to a packaging specification. The method may include a first step of selecting, based on a plurality of access sequences, at least one packaging specification out of a plurality of packaging specifications, and a second step of performing, according to the plurality of access sequences, a determination of a resulting packaging specification out of the selected at least one packaging specification.

In accordance with one embodiment, a packaging specification may include a plurality of data items which define at least one rounding rule. The data items, or packaging parameters, of each of the at least one packaging specification may include a part of a common packaging specification. For example, a first packaging specification may include the packaging parameters for package units and package sizes. A second packaging specification may include the packaging parameters for tolerances and rounding rules. The resulting packaging specification, which may be combination of these two packaging specifications, may therefore include the packaging parameters for package units, package sizes, tolerances, and rounding rules. Accordingly, several parts of a resulting packaging specification may be independently defined and maintained.

A further embodiment consistent with the invention may include copying the data items of the at least one packaging specification into the resulting packaging specification according to a set of predetermined rules for copying.

Depending on the sequence, which may be provided by access sequences, and depending on a set of rules for copying, different resulting packaging specifications may be calculated out of at least one packaging specification. An access sequence may include a plurality characteristic values.

In accordance with yet another embodiment consistent with the invention, a first sub-step may be provided for selecting, based on the plurality of characteristic values, a packaging specification out of the plurality of packaging specifications. A second sub-step may also be provided for selecting, based on a part of the plurality of characteristic values, a packaging specification out of the plurality of packaging specifications, if the first sub-step fails. Further, a third sub-step may be provided for performing the second sub-step, based on a plurality of characteristic values out of the part of the second sub-step, if the second sub-step fails.

Consistent with embodiments of the invention, the first step may be repeated for further pluralities of characteristic values until no plurality of characteristic values are available.

In an exemplary embodiment consistent with the invention, if a packaging specification is not found according to a given plurality of characteristic values, a method may perform several steps of reducing the plurality of characteristic values, whereby the reduced plurality of characteristic values, which may be a part of the plurality of characteristic values, may be used for further steps of selecting at least one packaging specification out of a plurality of packaging specifications. Thereby, a packaging specification may be found even if no packaging specification for the given plurality of characteristic values is maintained.

In accordance with another embodiment, the step of copying data items may include copying valid data items from a first selected packaging specification into the resulting packaging specification, and copying valid data items from further selected packaging specifications into the resulting packaging specification according to a set of predetermined rules for copying.

In accordance with further embodiments, the predetermined rules for copying may include at least one of the following rules: copying a data item from a packaging specification into the resulting packaging specification, if the corresponding data item in the resulting packaging specification is empty; or copying a data item from a packaging specification into the resulting packaging specification if the corresponding data item in the resulting packaging specification is not empty.

Thus, methods consistent with the invention may provide at least two principles for copying the data items into a resulting packaging specification: copying according to the FIFO (First-in, First Out) principle, and copying according to the LIFO (Last In, First Out) principle. If the first packaging specification has a higher priority than the subsequent packaging specification, the FIFO-principle may be used for copying data items into the resulting packaging specification.

Consistent with additional embodiments of the invention, a system may be provided that includes a data storage device which stores a plurality of packaging specifications and means for selecting, based on a plurality of access sequences, at least one packaging specification out of the plurality of packaging specifications. The system may also include means for determining, according to the plurality of access sequences, a resulting packaging specification out of the selected packaging specifications.

In one embodiment, the means for selecting at least one packaging specification out of a plurality of packaging specifications may be adapted to determine a packaging specification, based on a plurality of characteristic values, out of the plurality of packaging specifications, and determine a packaging specification, based on a part of the plurality of characteristic values, out of the plurality of packaging specifications.

Furthermore, consistent with additional embodiments of the invention, the means for determining one valid packaging specification out of the at least one packaging specification may be adapted to copy valid data items from a first packaging specification into a resulting packaging specification, and copy valid data items from further packaging specifications into the resulting packaging specification according to a set of predetermined rules for copying.

Additional embodiments of the present invention relate to computer-readable storage media, computerized systems, and computer program products. A computer program may be tangibly embodied in an information carrier and include program code.

It is to be understood that both the foregoing general description and the following detailed description are exemplary and explanatory only and are not restrictive of the invention, as claimed.

BRIEF DESCRIPTION OF DRAWINGS

The accompanying drawings, which are incorporated in and constitute a part of this specification, illustrate embodiments consistent with the invention and together with the description, serve to explain the principles of the invention. In the drawings.

DETAILED DESCRIPTION

Figure 1:
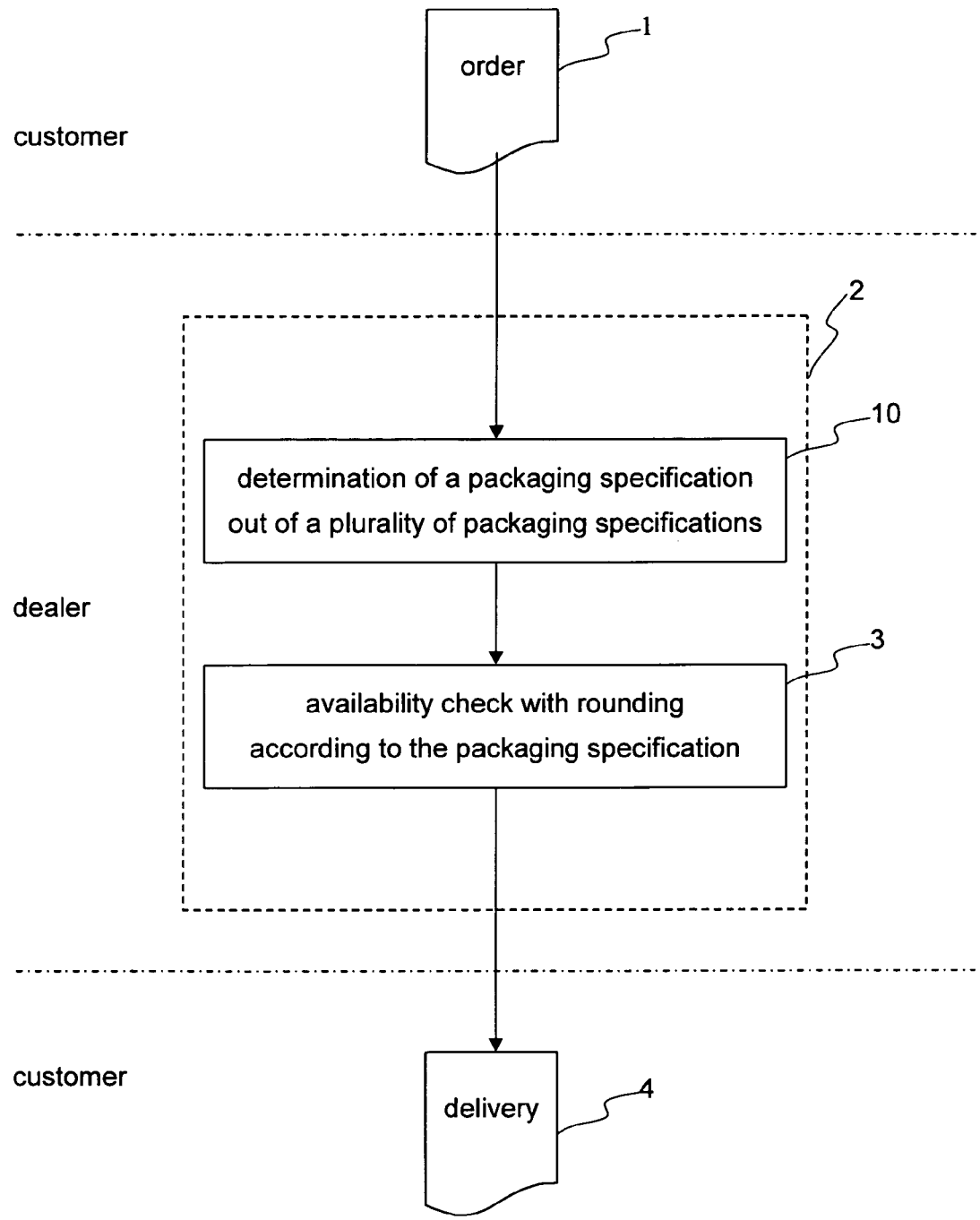
FIG. 1 illustrates, consistent with an embodiment of the invention, an exemplary method for use in a supply chain management system.

Reference will now be made in detail to embodiments of the invention, examples of which are illustrated in the accompanying drawings. Wherever possible, the same reference numbers will be used throughout the drawings to refer to the same or like parts.

In a supply chain management system, rounding using availability check confirms multiples of package sizes, which may guaranty that the delivered quantity of products is always a multiple of packages. Using only multiples of packages may optimize packaging and transportation of packages. Consistent with embodiments of the invention, the rounding process may be performed according to one or more rounding rules. The rounding rules may be stored in a plurality of packaging specifications. A rounding process may determine a valid packaging specification out of the plurality of packaging specifications whereby such a valid packaging specification can be a combination of one or more packaging specifications. Therefore, a packaging specification may provide all relevant data for rounding and packaging. The packaging specification may also define whether to perform a rounding process and how to perform a rounding process.

In one embodiment consistent with the invention, rounding relevant data may include a package unit, a package size, tolerance values, and rounding rules. The package units may define the units for packages, such as cartons or pallets. The package size may define the number of pieces which are packed into a package with respect to a package unit. For example, one carton may contain ten pieces and one pallet may contain a hundred pieces. The tolerance values may define an interval around the package size of a package unit. If the ordered quantity of products is within such an interval, the rounding process may round the ordered quantity of products to the package size of the corresponding package unit. For example, if the package unit is one pallet containing 100 pieces and the tolerance interval for this package unit is 90 pieces to 110 pieces, then the rounding process may round the ordered quantity of products to 100 pieces because the ordered quantity of products is within the range of 90 pieces to 110 pieces.

A rounding rule may define how to perform the rounding by the rounding process. Consistent with an embodiment of the invention, three rounding rules may be defined: rounding up, rounding down, and rounding to the nearest. "Rounding up" means to round up the ordered quantity of products to the next larger multiple of the smallest package size. "Rounding down" means to round down the ordered quantity of products to the next smaller multiple of the smallest package size. "Rounding to the nearest" means to round the ordered quantity of products to the nearest multiple of the smallest package size. For example, assume that the smallest package size is 10 pieces. A quantity of 38 pieces may be rounded as follows: rounding down results in 30 pieces (30 is the next smaller multiple of 10); rounding up results in 40 pieces (40 is the next larger multiple of 10); and rounding to the nearest results in 40 pieces (40 is the nearest multiple of 10).

TABLE 1

Exemplary Packaging Specification

| Package Unit | Package Size | Tolerance Value | Rounding Rule |
|---|---|---|---|
| 1 package | 2 pieces | | Up |
| 1 carton | 5 packages = 10 pieces | ±20% (±2 pieces) | |
| 1 pallet | 10 cartons = 100 pieces | ±10% (±10 pieces) | |

In the exemplary packaging specification shown in the above table, one package contains two pieces. As a result, tolerance values may not be allowed for this package unit because the package unit "package" is the smallest package unit.

As also illustrated in the example of Table 1, one carton contains five packages whereby each package contains two pieces. The tolerance values for this package unit may be defined as ±20% (±2 pieces). The resulting tolerance interval for the package unit "one carton" is therefore [8 pieces; 12 pieces].

As further illustrated in Table 1, one pallet contains ten cartons whereby each carton contains 5 packages. The tolerance values for the package unit "pallet" may be defined as ±10% (±10 pieces). The resulting tolerance interval for the package unit "pallet" is therefore [90 pieces; 110 pieces].

In this exemplary packaging specification, rounding rules may not be allowed for the package units "carton" and "pallet." However, consistent with embodiments of the invention, additional package units, package sizes, tolerance values, and rounding rules may be used.

FIG. 1 illustrates, consistent with an embodiment of the invention, an exemplary order process. In this exemplary embodiment, a customer may place an order 1 of a predetermined quantity of products with a dealer. Order 1 may be in the form of an electronic order transmitted by email or a traditional order transmitted by mail. Order 1 may include information about the ordered product and a quantity. The dealer may feed the data about order 1 into a supply chain management system 2, which may process order 1. In other embodiments consistent with the invention, the dealer may be a manufacturer, a supplier, or another customer.

When processing order 1, supply chain management system 2 may perform a process 10 of determining a packaging specification out of a plurality of packaging specifications, whereby the determined packaging specification may be a combination of one or more packaging specifications. This process will be described in more detail below with reference to FIG. 4.

After the determination process 10, supply chain management system 2 may perform an availability check 3. Availability check 3 may verify whether the ordered quantity of products is available within the dealer's stock. Consistent with embodiments of the invention, availability check 3 may round the ordered quantity of products to, for example, a multiple of the smallest package size according to the determined packaging specification. The rounding may be performed twice, once before and once after the availability check.

If the rounded quantity of products is available, supply chain management system 2 may trigger a delivery process 4 to deliver the rounded quantity of products to the customer.

Figure 2:
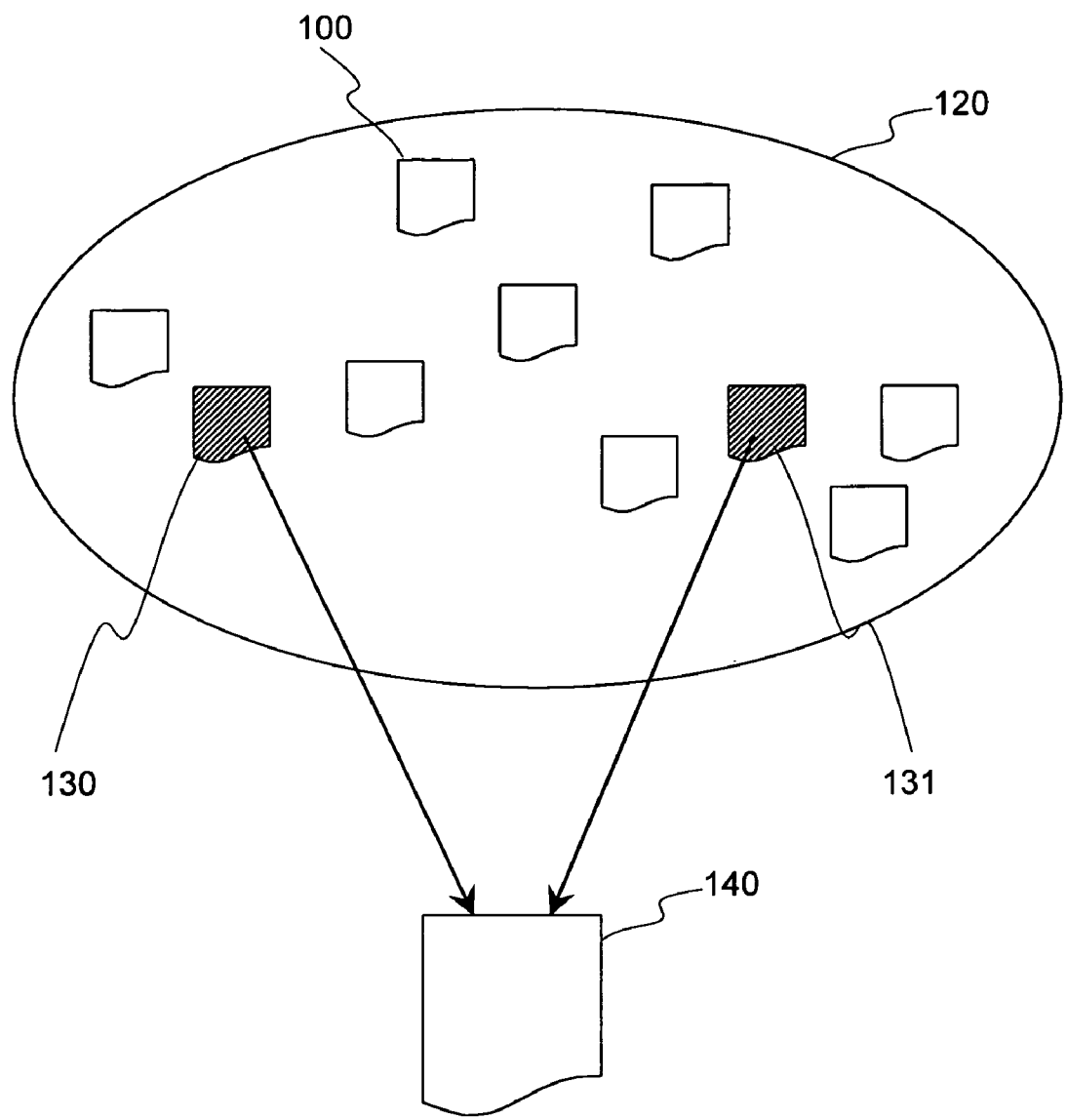
FIG. 2 illustrates, consistent with an embodiment of the invention, two exemplary packaging specifications out of a plurality of packaging specifications.

FIG. 2 illustrates, consistent with an embodiment of the invention, exemplary packaging specifications 100, 130, and 131. Packaging specifications may be stored within supply chain management system 2. Packaging specifications 130 and 131 may be defined by a predetermined number of characteristic values. Exemplary characteristic values include: customer type, order type, product, and product location. For example, packaging specification 130 may be defined by a characteristic combination of "customer type/order type" having the parameter values "middleman/emergency order," and packaging specification 131 may be defined by a characteristic combination of "product/product location" having the parameter values "screw/Germany".

Packaging specifications 130 and 131 may be determined out of a plurality of packaging specifications 120 using, for example, the access sequences "customer type/order type" and "product/product location." An access sequence may include a plurality of characteristic values.

Exemplary packaging specifications 130 and 131 may be combined to form a resulting packaging specification 140. A predetermined sequence and a set of rules may define how to perform the calculation of the combination of the packaging specifications 130 and 131. The predetermined sequence, in which the combination of the packaging specification has to be done, may be provided by the access sequences.

Figure 3A:
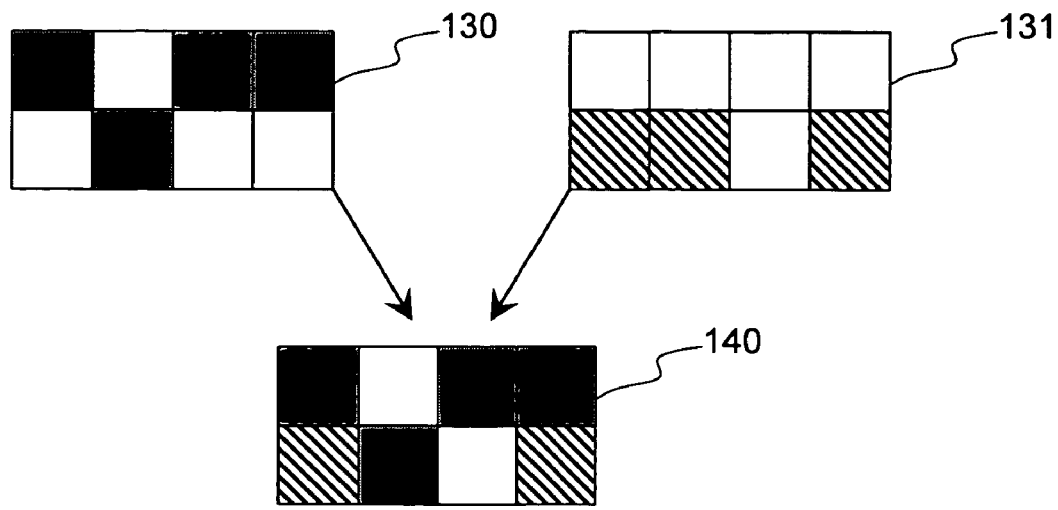
FIG. 3A illustrates, consistent with an embodiment of the invention, a first exemplary overlapping rule.
Figure 3B:
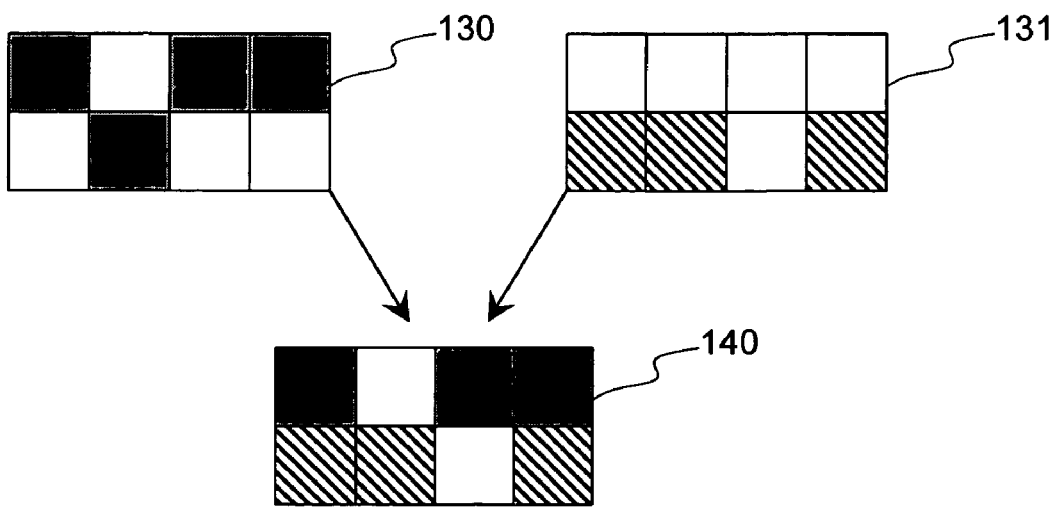
FIG. 3B illustrates, consistent with an embodiment of the invention, a second exemplary overlapping rule.

FIGS. 3A and 3B illustrate, consistent with embodiments of the invention, two different rules for calculating a resulting packaging specification 140. Packaging specifications 130 and 131 may each include eight items (illustrated as squares). An item may represent a packaging specification parameter.

FIG. 3A illustrates, consistent with an embodiment of the invention, determination of resulting packaging specification 140 from packaging specifications 130 and 131 according to the first-in, first-out principle (FIFO). In a first step, the relevant items (shown as gray shaded squares) of packaging specification 130 may be copied into resulting packaging specification 140. In a second step, relevant items (shown as hatched marked squares) of packaging specification 131 may be copied into the resulting packaging specification 140, if the corresponding item in the resulting packaging specification 140 is empty.

FIG. 3B illustrates, consistent with an embodiment of the invention, determination of resulting packaging specification 140 from packaging specification 130 and 131 according to the last-in, first-out principle (LIFO). As in FIG. 3A, in a first step, the relevant items (shown as gray shaded squares) of packaging specification 130 may be copied into resulting packaging specification 140. In a second step, the relevant items (shown as hatched marked squares) of packaging specification 131 may be copied into the resulting packaging specification 140, even if the corresponding item in resulting packaging specification 140 is not empty.

Consistent with embodiments of the invention, additional rules for copying items into a resulting packaging specification may be defined, such as using priorities for each item whereby the priorities of corresponding items are compared with each other.

The following example (Table 2) demonstrates the calculation of a resulting packaging specification with two packaging specifications. The first packaging specification may provide data about tolerance values, and the second packaging specification may provide data about package units. In this and the following examples, rounding rules may not be maintained.

TABLE 2

| Two Packaging Specifications | | | |
| --- | --- | --- | --- |
| First Packaging Specification | | Second Packaging Specification | |
| Package Units | Tolerances | Package Units | Tolerances |
| | ±10% | 1 package = 10 1 carton = 100 pieces | |
| | ±5% | 1 pallet = 1000 pieces | |

These two exemplary packaging specifications may be combined to a resulting packaging specification using the FIFO principle as discussed above. The resulting packaging specification is illustrated in Table 3.

TABLE 3

| Resulting Packaging Specification | |
| --- | --- |
| Package Units | Tolerances |
| 1 package = 10 pieces | |
| 1 carton = 100 pieces | ±10% |
| 1 pallet = 1000 pieces | ±5% |

Using the LIFO principle (discussed above) with this example, the same resulting packaging specification may be created as shown in Table 3 because the corresponding items in the resulting packaging specification are empty while executing the second step of copying items from the second packaging specification into the resulting packaging specification.

Figure 4:
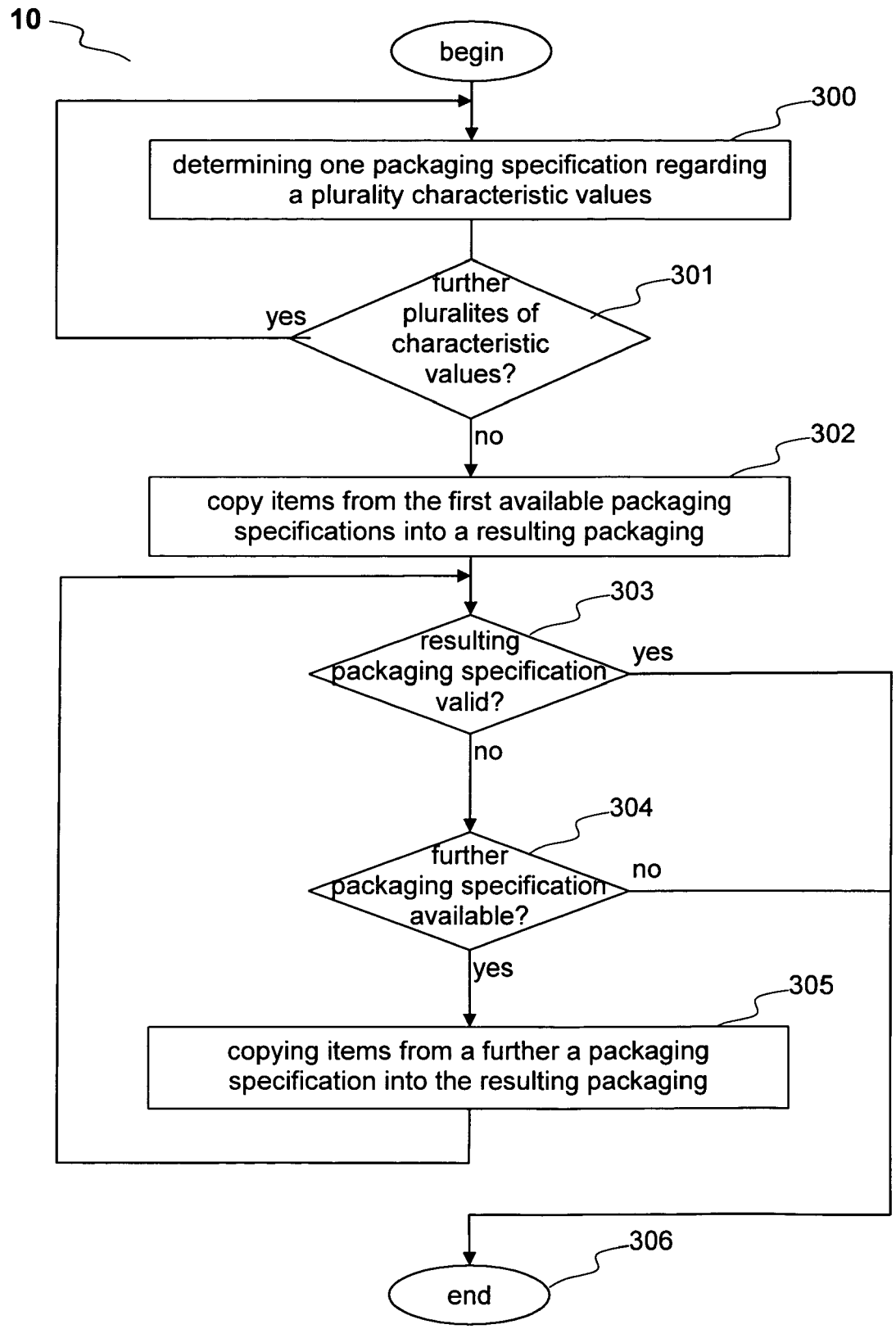
FIG. 4 illustrates, consistent with an embodiment of the invention, a more detailed illustration of the exemplary method illustrated in FIG. 1.

FIG. 4 illustrates, consistent with an embodiment of the invention, an exemplary method for implementing the determination step 10 (FIG. 1). The method may begin with step 300. In step 300, a packaging specification may be determined according to a plurality of access sequences, whereby each access sequence may include a plurality of characteristic values. Step 300 may be repeated until no further access sequences are available. Determination of whether a further access sequence is available or not is checked within step 301. In one exemplary embodiment consistent with the invention, a first access sequence may be "customer type/order type" having the parameter values "middleman/emergency order," and a second access sequence may be "product/product location" having the parameter values "screw/Germany." In this exemplary embodiment, step 300 may be performed twice—once for each access sequence.

The result of steps 300 and 301 may be at least one packaging specification. Step 302 may copy the items that are not empty from the first packaging specification into a resulting packaging specification. In this exemplary embodiment, the first packaging specification may be the first available packaging specification out of the at least one packaging specification determined in step 300. In other embodiments consistent with the invention, the at least one packaging specification may be sorted according to several sort keys. For example, one possible sort key may be the priority of the packaging specifications, if priorities are stored together with the packaging specification. The order of the packaging specifications may impact the resulting packaging specification.

The following example based on Table 4 illustrates the importance of the order of the packaging specifications.

TABLE 4

| First Packaging Specification | | Second Packaging Specification | |
|---|---|---|---|
| Package Units | Tolerances | Package Units | Tolerances |
| 1 package = 5 pieces | | 1 package = 10 | |
| | ±10% | 1 carton = 100 pieces | |
| | ±5% | 1 pallet = 1000 pieces | ±10% |

Using the FIFO principle, copying in a first step the items of the first packaging specification, and copying in a second step the items of the second packaging specification into a resulting packaging specification leads to a result as illustrated in Table 5.

TABLE 5

| Resulting Packaging Specification | |
|---|---|
| Package Units | Tolerances |
| 1 package = 5 pieces | |
| 1 carton = 100 pieces | ±10% |
| 1 pallet = 1000 pieces | ±5% |

Otherwise, if in the first step the items of the second packaging specification are copied and in the second step the items of the first packaging specification are copied, the result may be as illustrated in Table 6.

TABLE 6

| Resulting Packaging Specification | |
|---|---|
| Package Units | Tolerances |
| 1 package = 10 pieces | |
| 1 carton = 100 pieces | ±10% |
| 1 pallet = 1000 pieces | ±10% |

At step 303, the resulting packaging specification may be validated. The resulting packaging specification is valid if all necessary items within the resulting packaging specification are not empty and are valid. Therefore, a valid resulting packaging specification may be calculated out of the first packaging specification within step 302 even further packaging specifications are available.

If the resulting packaging specification, which is validated in step 303, is valid, the program flow in this exemplary embodiment may end (step 306). In other embodiments consistent with the invention, the program flow may continue by copying items from further packaging specifications into the resulting packaging specification even if the resulting packaging specification is valid.

If, however, the resulting packaging specification is not valid, the program flow may proceed with step 304. In step 304, a determination may be made as to whether or not further packaging specifications, determined in step 300, are available. If further packaging specifications are available, the method may proceed with step 305 by copying items from the next packaging specification into the resulting packaging specification according to a set of copying rules. Exemplary rules are the FIFO or LIFO principles discussed above. After step 305, the method may return to step 303 to test the validity of the new resulting packaging specification. If, however, no further packaging specification is available, the program flow may end (step 306).

Steps 303, 304, and 305 may be repeated until no further packaging specification is available as determined in step 304, or until the resulting packaging specification is valid as determined in step 303. As a result, the program flow shown in FIG. 4 may provide a valid packaging specification to availability check process 3 (in FIG. 1).

Figure 5A:
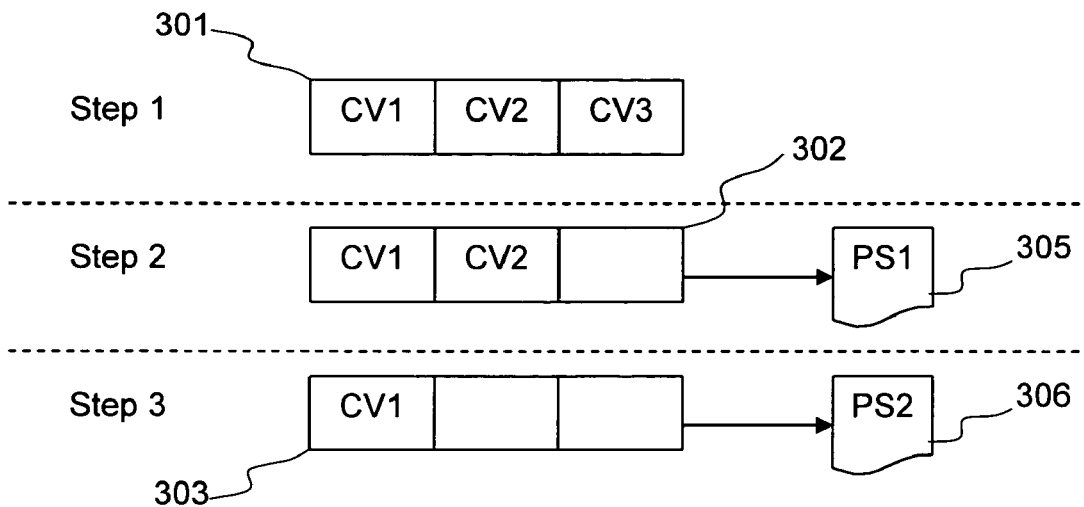
FIG. 5A illustrates, consistent with an embodiment of the invention, an exemplary determination of a packaging specification.
Figure 5B:
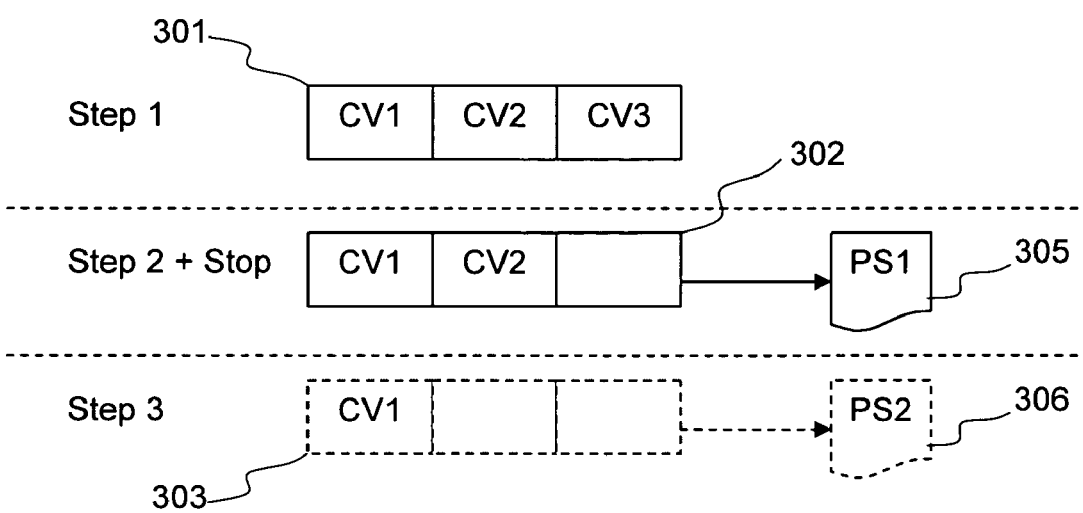
FIG. 5B illustrates, consistent with an embodiment of the invention, another exemplary determination of a packaging specification.

FIGS. 5A and 5B illustrate, consistent with embodiments of the invention, exemplary implementations of the method within step 300 of FIG. 4, which determines a packaging specification according to a plurality of access sequences.

FIG. 5A illustrates an exemplary determination of a packaging specification, whereby the determination is performed in a "non exclusive access mode." The items 301, 302, and 303 represent a plurality of characteristic values of an access sequence. Item 301 may include three characteristic values (CV1, CV2, CV3). In a first step (Step 1) of the determination of a packaging specification, a check may be made to determine if a packaging specification is maintained according to the characteristic values of item 301. If such a packaging specification exists, this packaging specification may be added to a list of determined packaging specifications, and the method may continue with the next step (Step 2). In this example, no packaging specification is maintained according the item 301. Therefore, at Step 2, the method may check if a packaging specification is maintained according to the characteristic values of item 302. In one embodiment consistent with the invention, the characteristic values of item 302 may be a part of the characteristic values of item 301. In this example, the packaging specification 305 (PS1) is maintained by item 302 and will be added to the list of list of determined packaging specifications.

Because the method is performed in a "non exclusive access mode" the method may continue to Step 3. Item 303 may include a part of the characteristic values of item 302. In this example, a packaging specification 306 (PS1) may be determined and added to the list of determined packaging specifications. As a result, the list of determined packaging specifications may include two packaging specifications 305 and 306.

FIG. 5B illustrates an exemplary determination of a packaging specification, whereby the determination may be performed in a "exclusive access mode." The exemplary items in FIG. 5B are the same as in FIG. 5A, with the difference being the access mode. If the method is performed in the "exclusive access mode" the determining may end when a packaging specification is found. In this example, the method may end in Step 2 because the packaging specification 305 is found in item 302 (as described above with reference to FIG. 5A). As a result, the list of determined packaging specifications may include one packaging specification 305.

The method of determining a packaging specification out of a plurality of packaging specifications may be performed for further access sequences, whereby the list of determined packaging specifications may be expanded if further packaging specifications are determined.

If one access sequence is given by the values (order type/product group) and another access sequence is given by the values (product location/product group), the determination method may be performed twice. The resulting list of determined packaging specifications may therefore include at least two packaging specifications.

The packaging specifications, stored in the list of determined packaging specifications, may be used to create a resulting packaging specification according to the method as described in FIG. 3 and FIG. 4, for example.

The present techniques and exemplary embodiments described herein can be implemented in digital electronic circuitry, or in computer hardware, firmware, software, or in combinations of them. Systems consistent with the invention can be implemented in a computer program product tangibly embodied in a machine-readable storage device for execution by a programmable processor. Method steps according to the invention can be performed by a programmable processor executing a program of instructions to perform functions of the invention by operating on the basis of input data, and by generating output data. The invention may be implemented in one or several computer programs that are executable in a programmable system, which may include at least one programmable processor coupled to receive data from, and transmit data to, a storage system, at least one input device, and at least one output device, respectively. Computer programs may be implemented in a high-level or object-oriented programming language, and in assembly or machine code. The language or code can be a compiled or interpreted language or code. Processors may include general and special purpose microprocessors. A processor may receive instructions and data from memories, in particular from read-only memories and random access memories. A computer may include one or more mass storage devices for storing data, such as magnetic disks (internal hard disks and removable disks), magneto-optical disks, and optical disks. Storage devices suitable for tangibly embodying computer program instructions and data include all forms of non-volatile memory, including, for example, semiconductor memory devices, such as EPROM, EEPROM, and flash memory devices; magnetic disks such as internal hard disks and removable disks; magneto-optical disks; and CD-ROM disks. Any of the foregoing can be supplemented by or incorporated in ASICs (application-specific integrated circuits). A computer program can be deployed to be executed on one computer or on multiple computers at one site or distributed across multiple sites and interconnected by a communication network.

The computer systems or distributed computer networks as mentioned above may be used, for example, for producing goods, delivering parts for assembling products, controlling technical or economical processes, or implementing telecommunication activities.

To provide for interaction with a user, a computer system may be provided having a display device, such as a monitor or LCD screen, for displaying information to a user. The computer system may also include a keyboard and a pointing device, such as a mouse or a trackball, by which the user can provide input to the computer system. The computer system can be programmed to provide a graphical or text user interface through which computer programs interact with users.

A computer may include a processor, memory coupled to the processor, a hard drive controller, a video controller and an input/output controller coupled to the processor by a processor bus. The hard drive controller may be coupled to a hard disk drive suitable for storing executable computer programs, including programs embodying the present technique. The I/O controller may be coupled by means of an I/O bus to an I/O interface. The I/O interface may receive and transmit in analog or digital form over at least one communication link. Such a communication link may be a serial link, a parallel link, local area network, or wireless link (e.g. an RF communication link). A display may be coupled to an interface, which may be coupled to an I/O bus. A keyboard and pointing device may also coupled to the I/O bus. Alternatively, separate buses may be used for the keyboard pointing device and I/O interface.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

It will be understood that various modifications may be made without departing from the spirit and scope of the claims, such as performing steps of the disclosed methods in a different order, combining components of the disclosed systems in a different manner, and/or replacing or supplementing components of the disclosed systems with other components.

What is claimed is:

1. A method for packing products according to a packaging specification, the method comprising:
   selecting, based on at least one of a plurality of access sequences, at least one packaging specification out of a plurality of packaging specifications stored in a supply chain management system;
   determining if a further access sequence of the plurality of access sequences is available;
   repeating the selecting step when it is determined that a further access sequence is available; and
   using a processor to compute a determination of a resulting packaging specification out of the selected at least one packaging specification based on a set of rules for combining packaging specifications included in the plurality of access sequences.

2. The method of claim 1, wherein a packaging specification comprises a plurality of data items which define at least one rounding rule.

3. The method of claim 2, wherein the step of computing a determination of a resulting package specification further comprises a sub-step of copying the data items of the at least one packaging specification into the resulting packaging specification according to a set of predetermined rules for copying.

4. The method of claim 3, wherein an access sequence comprises a plurality of characteristic values.

5. The method of claim 4, wherein the selecting step further comprises:
   a first sub-step of selecting, based on the plurality of characteristic values, a packaging specification out of the plurality of packaging specifications;
   a second sub-step of selecting, based on a part of the plurality of characteristic values, a packaging specification out of the plurality of packaging specifications, if in the first sub-step no packaging specifications were found; and
   a third sub-step of performing the second sub-step, based on a plurality of characteristic values out of the part of the second sub-step, if in the second sub-step no packaging specifications were found.

6. The method of claim 5, wherein the selecting step is repeated for further pluralities of access sequences until no plurality of access sequences are available.

7. The method of claim 6, wherein the sub-step of copying data items further comprises:
   copying valid data items from a first selected packaging specification into the resulting packaging specification; and
   copying valid data items from further selected packaging specifications into the resulting packaging specification according to a set of predetermined rules for copying.

8. The method of claim 7, wherein the set of predetermined rules for copying comprises at least one of the following rules:
   copying a data item from a packaging specification into the resulting packaging specification if the corresponding data item in the resulting packaging specification is empty; and
   copying a data item from a packaging specification into the resulting packaging specification if the corresponding data item in the resulting packaging specification is not empty.

9. A system, comprising:
   a data storage device which stores a plurality of packaging specifications;
   means for selecting, based on at least one of a plurality of access sequences, at least one packaging specification out of the plurality of packaging specifications;
   means for determining if a further access sequence of the plurality of access sequences is available, wherein the selecting is repeated when it is determined that a further access sequence is available; and
   means for performing a determination of a resulting packaging specification out of the selected packaging specifications based on a set of rules for combining packaging specifications included in the plurality of access sequences.

10. The system of claim 9, wherein the means for selecting at least one packaging specification out of a plurality of packaging specifications is adapted to perform the following steps:
    determining a packaging specification, based on a plurality of characteristic values, out of the plurality of packaging specifications; and
    determining a packaging specification, based on a part of the plurality of characteristic values, out of the plurality of packaging specifications.

11. The system of claim 10, wherein the means for determining one valid packaging specification out of the at least one packaging specification is adapted to perform the following steps:
    copying valid data items from a first packaging specification into a resulting packaging specification; and
    copying valid data items from further packaging specifications into the resulting packaging specification according to a set of predetermined rules for copying.

12. A computer-readable storage medium comprising program code instructions which, when executed by a processor, perform a method for packing products according to a packaging specification, the method comprising:
    selecting, based on at least one of a plurality of access sequences, at least one packaging specification out of a plurality of packaging specifications stored in a supply chain manaqement system;
    determining if a further access sequence of the plurality of access sequences is available;
    repeating the selecting step when it is determined that a further access sequence is available; and
    computing a determination of a resulting packaging specification out of the selected at least one packaging specification based on a set of rules for combining packaging specifications included in the plurality of access sequences.

13. The computer-readable medium of claim 12, wherein a packaging specification comprises a plurality of data items which define at least one rounding rule.

14. The computer-readable medium of claim 13, wherein the step of computing a determination of a resulting package specification further comprises a sub-step of copying the data items of the at least one packaging specification into the resulting packaging specification according to a set of predetermined rules for copying.

15. The computer-readable medium of claim 14, wherein an access sequence comprises a plurality of characteristic values.

16. The computer-readable medium of claim 15, wherein the selecting step further comprises:
    a first sub-step of searching, based on the plurality of characteristic values, a packaging specification out of the plurality of packaging specifications;
    a second sub-step of searching, based on a part of the plurality of characteristic values, a packaging specification out of the plurality of packaging specifications, if in the first sub-step no packaging specifications were found; and a third sub-step of performing the second sub-step, based on a plurality of characteristic values out of the part of the second sub-step, if in the second sub-step no packaging specifications were found.

17. The computer-readable medium of claim 16, wherein the selecting step is repeated for further pluralities of access sequences until no plurality of access sequences are available.

18. The computer-readable medium of claim 17, wherein the sub-step of copying data items further comprises:

copying valid data items from a first selected packaging specification into the resulting packaging specification; and copying valid data items from further selected packaging specifications into the resulting packaging specification according to a set of predetermined rules for copying.

19. The computer-readable medium of claim 18, wherein the set of predetermined rules for copying comprises at least one of the following rules:

copying a data item from a packaging specification into the resulting packaging specification if the corresponding data item in the resulting packaging specification is empty; and copying a data item from a packaging specification into the resulting packaging specification if the corresponding data item in the resulting packaging specification is not empty.

* * * * *